(12) United States Patent
Maruyama et al.

(10) Patent No.: US 10,613,277 B2
(45) Date of Patent: Apr. 7, 2020

(54) MULTICORE OPTICAL CONNECTOR AND METHOD OF MANUFACTURING THE SAME

(71) Applicant: TOYO SEIKAN GROUP HOLDINGS, LTD., Tokyo (JP)

(72) Inventors: Naofumi Maruyama, Kanagawa (JP); Naoki Misu, Kanagawa (JP)

(73) Assignee: Toyo Seikan Group Holdings, Ltd., Tokyo (JP)

( * ) Notice: Subject to any disclaimer, the term of this patent is extended or adjusted under 35 U.S.C. 154(b) by 0 days.

(21) Appl. No.: 16/307,392

(22) PCT Filed: May 9, 2017

(86) PCT No.: PCT/JP2017/017480
§ 371 (c)(1),
(2) Date: Dec. 5, 2018

(87) PCT Pub. No.: WO2017/212845
PCT Pub. Date: Dec. 14, 2017

(65) Prior Publication Data
US 2019/0219773 A1 Jul. 18, 2019

(30) Foreign Application Priority Data
Jun. 10, 2016 (JP) .................. 2016-116204

(51) Int. Cl.
*G02B 6/38* (2006.01)
*G02B 6/32* (2006.01)
(Continued)

(52) U.S. Cl.
CPC .......... *G02B 6/3822* (2013.01); *G02B 6/255* (2013.01); *G02B 6/32* (2013.01); *G02B 6/3853* (2013.01);
(Continued)

(58) Field of Classification Search
None
See application file for complete search history.

(56) References Cited

U.S. PATENT DOCUMENTS 5,214,730 A * 5/1993 Nagasawa ............ G02B 6/3821
385/59
5,241,612 A * 8/1993 Iwama .................. G02B 6/32
385/59
(Continued)

FOREIGN PATENT DOCUMENTS

JP 2004-219944 8/2004
JP 2006-235245 9/2006
(Continued)

OTHER PUBLICATIONS

International Search Report issued in WIPO Patent Application No. PCT/JP2017/017480, dated Aug. 8, 2017.
(Continued)

*Primary Examiner* — Tina M Wong
(74) *Attorney, Agent, or Firm* — Greenblum & Bernstein, P.L.C.

(57) ABSTRACT

A multicore optical connector includes: a ferrule in which a plurality of optical fibers with lenses are arranged and held, the optical fibers with lenses having GRIN lenses fused to tips of optical fibers; and a coupling member which couples a pair of the ferrules so that the ferrules oppose each other in a non-contact state and end faces of the ferrules are parallel to each other, wherein the ferrules each have an end face inclined by a set angle $\theta_0$ relative to a central axis Of, the GRIN lenses are arranged and held parallel to the central axis Of so that a center of arrangement Op is at a position eccentric by $\Delta t$ relative to the central axis Of, and the optical fibers with lenses held by the pair of the ferrules have end faces of the GRIN lenses inclined along the end faces of the ferrules.

10 Claims, 6 Drawing Sheets

(51) Int. Cl.
   *G02B 6/40* (2006.01)
   *G02B 6/255* (2006.01)
(52) U.S. Cl.
   CPC ......... *G02B 6/3863* (2013.01); *G02B 6/3882* (2013.01); *G02B 6/3885* (2013.01); *G02B 6/40* (2013.01); *G02B 6/403* (2013.01)

(56) References Cited

U.S. PATENT DOCUMENTS

| | | | | |
|---|---|---|---|---|
| 6,012,852 | A * | 1/2000 | Kadar-Kallen | G02B 6/32 385/74 |
| 6,438,250 | B1 * | 8/2002 | Johannet | H05K 9/00 174/126.1 |
| 6,542,665 | B2 * | 4/2003 | Reed | A61B 5/0084 359/652 |
| 6,655,850 | B2 * | 12/2003 | Mann | G02B 6/32 385/33 |
| 8,662,758 | B2 * | 3/2014 | Huang | G02B 6/3895 385/52 |
| 9,057,847 | B2 * | 6/2015 | Lin | G02B 6/3849 |
| 9,360,632 | B2 * | 6/2016 | Arao | G02B 6/3818 |
| 9,645,325 | B2 * | 5/2017 | Fortusini | G02B 6/3853 |
| 9,739,948 | B2 * | 8/2017 | Watanabe | G02B 6/32 |
| 10,191,218 | B2 * | 1/2019 | Wada | G02B 6/262 |
| 2016/0077284 | A1 | 3/2016 | Arao et al. | |
| 2016/0085030 | A1 | 3/2016 | Arao et al. | |
| 2016/0154189 | A1 | 6/2016 | Elliott | |
| 2019/0121026 | A1 * | 4/2019 | Fukuda | G02B 6/262 |
| 2019/0219773 | A1 * | 7/2019 | Maruyama | G02B 6/3885 |

FOREIGN PATENT DOCUMENTS

| | | |
|---|---|---|
| JP | 2009-47993 | 3/2009 |
| JP | 2014-048532 | 3/2014 |
| JP | 2016-057540 | 4/2016 |
| JP | 2016-061942 | 4/2016 |
| WO | 2016/084113 | 6/2016 |

OTHER PUBLICATIONS

Japanese Ofice Action (with English translation) issued in Application No. 2016-116204 dated Dec. 11, 2019.
Chinese Ofice Action (with English translation) issued in Application No. 201780033411.2 dated Oct. 30, 2019.
European Ofice Action issued in Application No. 17810027 dated Dec. 18, 2019.

* cited by examiner

MULTICORE OPTICAL CONNECTOR AND METHOD OF MANUFACTURING THE SAME

TECHNICAL FIELD

The present invention relates to a multicore optical connector and a method of manufacturing the same.

BACKGROUND ART

Optical interconnection is attracting attention as technology for achieving higher speed, larger capacity, and lower power consumption in information transmission. Important element technology in optical interconnection is connection technology of optical wiring, and connections that are simple but provide high coupling efficiency are required not only for connecting optical fibers with each other but also for connecting optical wiring between boards, between chips, and within chips.

In connections of optical wiring, a connector connection using a connecting terminal called a ferrule is generally known, and configuring connectors to have multiple cores is essential in realizing connections of high-density optical wiring. As a conventional multicore optical connector, a known multicore optical connector is provided with: ferrules having positioning holes in which a plurality of end portions of optical fibers are arranged and a pair of guide holes into which guide pins are to be inserted; and the guide pins which are inserted into the guide holes of the ferrules to coaxially connect a pair of the ferrules (refer to PTL 1 below).

Meanwhile, an optical fiber with lens (an optical fiber collimator) in which a GRIN lens (a gradient index lens) is fused to a tip of an optical fiber is known (refer to PTL 2 below). A connection of optical wiring using an optical fiber with lens has features that enables energy density of emitted light to be reduced due to beam expansion by a GRIN lens and, at the same time, enables connecting end faces to be mutually contactless. When the energy density of emitted light is reduced, a phenomenon where a connecting end face or an interior of an optical fiber is damaged by generation of heat caused by energy concentrating on a foreign object adhered to an end face, a fiber fuse associated with the generation of heat, or the like can be avoided, and further by making the connecting end faces contactless, optical coupling can be performed even when a foreign object is present on a connecting end face and the trouble of cleaning the connecting end face or the like can be spared. Furthermore, in a connector connection, making connecting end faces contactless prevents scuffing or defects from occurring on a ferrule end face.

CITATION LIST

Patent Literature

[PTL 1] Japanese Patent Application Laid-open No. 2004-219944

[PTL 2] Japanese Patent Application Laid-open No. 2009-47993

SUMMARY OF INVENTION

Technical Problem

In the connection of optical wiring using an optical fiber with lens, making an end face of a GRIN lens contactless causes the end face to act as an interface between the GRIN lens (a high-refractive index layer) and air (a low-refractive index layer), and reflection return light on the end face becomes conspicuous. Since the reflection return light is collected by the GRIN lens and is inversely incident to the optical fiber, the reflection return light not only increases transmission loss but also has an adverse effect on a light source and the like.

In order to address this issue, reflection return light can be reduced and inverse incidence of reflection return light to the optical fiber can be prevented by inclining an end face of the GRIN lens relative to a central axis of the GRIN lens or the optical fiber. However, in accordance with Snell's law, since inclining the end face of the GRIN lens causes an optical axis of coupled light to have a prescribed angle relative to the central axis of the GRIN lens, when connecting a pair of ferrules using a multicore optical connector by coaxially butting the ferrules against each other, optical coupling cannot be performed if a central axis of the ferrules and a center of arrangement of GRIN lenses match each other.

In addition, in a case where a plurality of GRIN lenses are arranged along an inclination direction of the end faces of the GRIN lenses, there is a problem in that a difference is created among lens lengths of the GRIN lenses depending on arrangement positions when polishing an end face of a ferrule to form an inclined end face, which makes it difficult to perform a connection with low loss so that beam waist positions of coupled light coincide in all optical fibers with lenses.

The present invention has been proposed in order to cope with such situations. Specifically, an object of the present invention is, for example, to enable, in a multicore optical connector in which a plurality of optical fibers with lenses are arranged and held in a ferrule, reflection return light to be suppressed and low-loss connection to be performed.

Solution to Problem

In order to solve the problems described above, a multicore optical connector and a method of manufacturing the same according to the present invention are configured as follows.

A multicore optical connector, including: a ferrule in which a plurality of optical fibers with lenses are arranged and held, the optical fibers with lenses having GRIN lenses fused to tips of optical fibers; and a coupling member which couples a pair of the ferrules so that the ferrules oppose each other in a non-contact state and end faces of the ferrules are parallel to each other, wherein the ferrules each have the end face inclined by a set angle relative to a central axis, and the GRIN lenses are arranged and held parallel to the central axis so that a center of arrangement is at a position eccentric relative to the central axis, and the optical fibers with lenses held by the pair of the ferrules nave end faces of the GRIN lenses inclined along the end faces of the ferrules so that the optical fibers with lenses are optically coupled to each other, and in the optical fibers with lenses arranged in an inclination direction of the end faces of the ferrules, fusing positions between the GRIN lenses and the optical fibers are arranged so as to be inclined along the end faces.

A method of manufacturing a multicore optical connector including a ferrule in which a plurality of optical fibers with lenses are arranged and held, the optical fibers with lenses having GRIN lenses fused to tips of optical fibers, and a coupling member which couples a pair of the ferrules so that the ferrules oppose each other in a non-contact state and end faces of the ferrules are parallel to each other, the method including: a step of molding each of the ferrules in which a plurality of holes along a central axis of the ferrule are arranged so that a center of arrangement is eccentric relative to the central axis; a step of inserting the optical fibers with lenses into the holes, arranging fusing positions between the GRIN lenses and the optical fibers so as to be inclined by a set angle relative to the central axis, and fixing the optical fibers with lenses to the ferrules; and a step of polishing the end faces of the ferrules so that a direction of inclined arrangement of the fusing positions is parallel to the end faces.

Advantageous Effects of Invention

According to the multicore optical connector and the method of manufacturing the same described above, by inclining an end face of a GRIN lens of an optical fiber with lens relative to a central axis of a ferrule, reflection return light can be reduced and, at the same time, inverse incidence of reflection return light to an optical fiber can be suppressed. In addition, by arranging a fusing position between the GRIN lens and the optical fiber so as to be inclined along an inclination of an end face of the ferrule, multicore connector connection of optical fibers with lenses can be performed while keeping a lens length of the GRIN lens constant. Accordingly, in a multicore optical connector in which a plurality of optical fibers with lenses are arranged and held in a ferrule, reflection return light can be suppressed and low-loss connection can be performed.

DESCRIPTION OF EMBODIMENTS

Figure 1A:
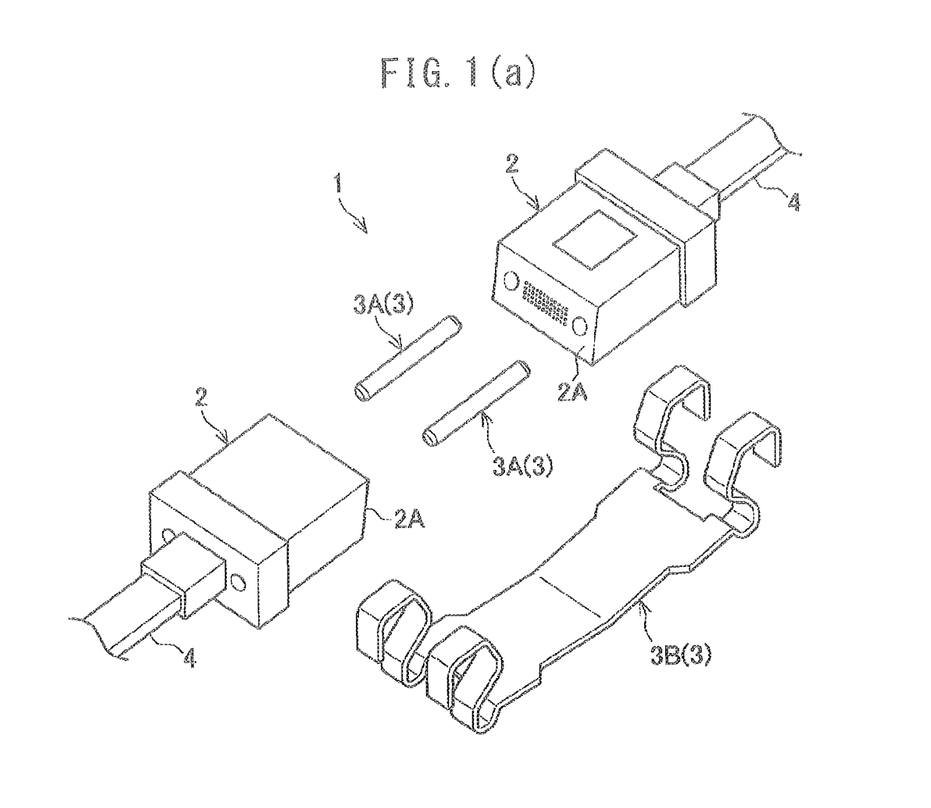
FIG. 1(a) and FIG. 1(b) are explanatory diagrams showing an overall configuration of a multicore optical connector according to an embodiment of the present invention (in which FIG. 1(a) represents a non-connected state and FIG. 1(b) represents a connected state).
Figure 1B:
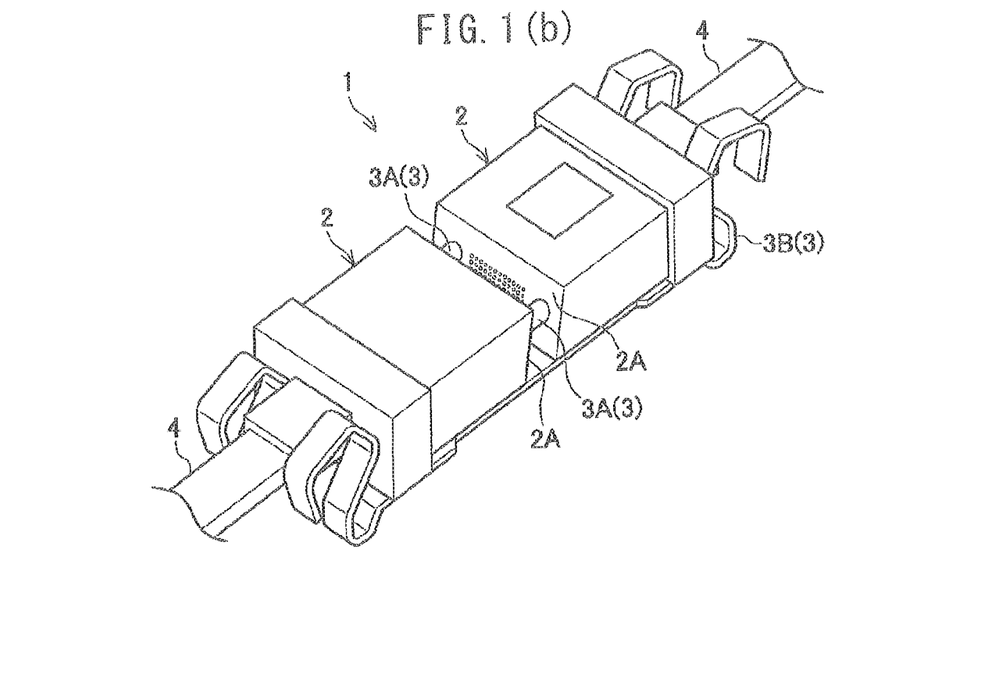

Hereinafter, an embodiment of the present invention will be described with reference to the drawings. FIG. 1(a) and FIG. 1(b) show an overall configuration of a multicore optical connector according to an embodiment of the present invention in which FIG. 1(a) represents a non-connected state and FIG. 1(b) represents a connected state. A multicore optical connector 1 is constituted by a pair of ferrules 2 and a coupling member 3. The pair of ferrules 2 is a pair of a same ferrule, and the ferrules 2 are vertically flipped to face each other so that end faces 2A are parallel to each other. The coupling member 3 is constituted by a guide pin 3A and a clamp spring 3B in this example, however, the configuration of the coupling member 3 is not limited to this, and the coupling member 3 may be an adapter or the like which holds the pair of ferrules 2.

A plurality of optical fibers with lenses 4 are arranged and held in the ferrules 2, and the end faces 2A of the ferrules 2 are inclined by a set angle relative to a central axis of the ferrules 2. The coupling member 3 coaxially couples the ferrules 2 in a non-contact state so that the inclined end faces 2A are separated from each other by a set distance.

Figure 2:
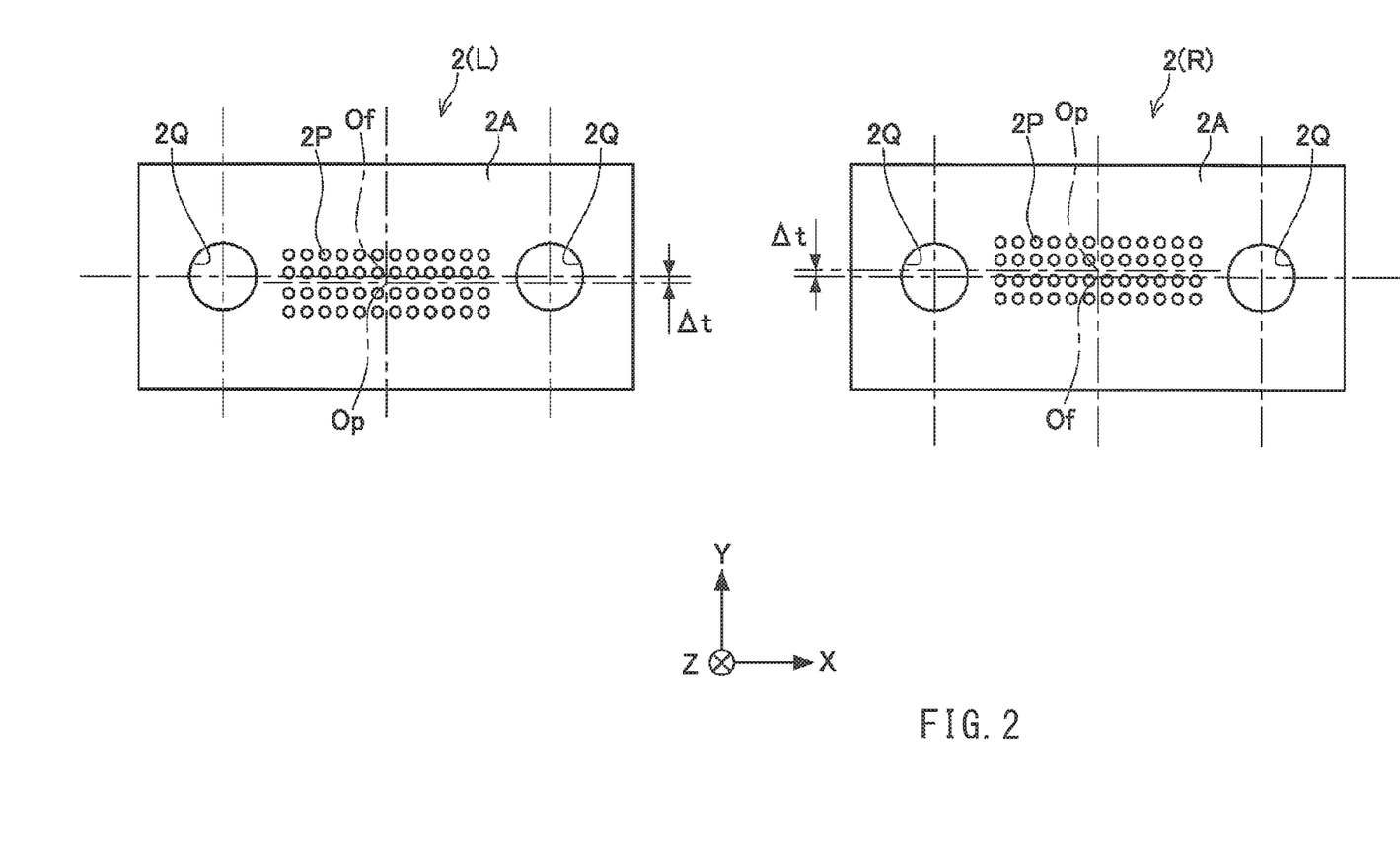
FIG. 2 is a front view of a ferrule in a multicore optical connector according to an embodiment of the present invention.

As shown in FIG. 2, in the ferrules 2 (in the diagram, a right-side ferrule is denoted as 2(R) and a left-side ferrule is denoted as 2(L)), a hole 2P that holds an optical fiber with lens is formed in plurality in two directions (an X direction and a Y direction in the diagram) that are perpendicular to a direction of a central axis Of (a Z direction in the diagram) of the ferrules 2. In the illustrated example, the holes 2P are arranged in m-number of rows (12 rows) in a horizontal direction (the X direction) and in n-number of rows (4 rows) in a vertical direction (the Y direction), and a center of arrangement (an arrangement central axis) Op of the holes 2P is eccentric by $\Delta t$ in the Y direction in the diagram relative to the central axis Of of the ferrules 2. In addition, the ferrules 2 are provided with a pair of guide holes 2Q. The guide holes 2Q coaxially couple the pair of ferrules 2 when the guide pin 3A is inserted therein and are formed at positions that are vertically and horizontally symmetrical relative to the central axis Of of the ferrules 2.

An inclination direction of the end face 2A of the ferrules 2 is consistent with a direction of eccentricity of the center of arrangement (the arrangement central axis) Op. In other words, in the case of the right-side ferrule 2(R) in the diagram, the direction of eccentricity of the center of arrangement Op and the inclination direction of the end face 2A are a +Y direction in the diagram, and in the case of the left-side ferrule 2(L) in the diagram, the direction of eccentricity of the center of arrangement Op and the inclination direction of the end face 2A are a −Y direction in the diagram.

Figure 3:
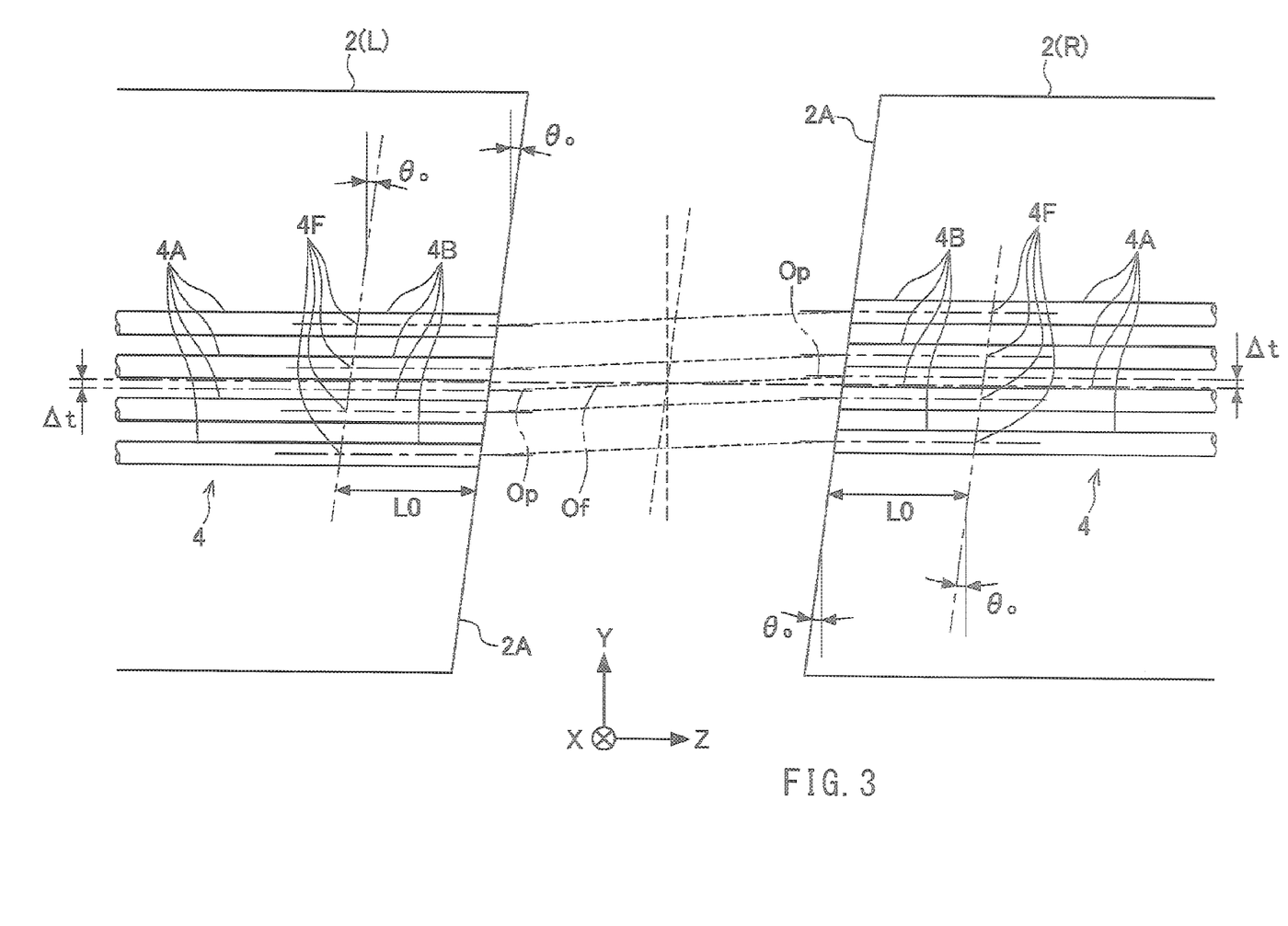
FIG. 3 is an explanatory diagram showing a pair of ferrules holding optical fibers with lenses.

As shown in FIG. 3, in the optical fiber with lens 4 held by the ferrules 2, a GRIN lens 4B is fused to a tip of an optical fiber 4A, and an end face of the GRIN lens 4B is inclined along the end face 2A of the ferrules 2 so that the optical fibers with lenses 4 are optically coupled to each other. In addition, in the optical fibers with lenses 4 arranged in the inclination direction (the Y direction in the diagram) of the end faces 2A of the ferrules 2, fusing positions 4F between the GRIN lens 4B and the optical fiber 4A are arranged so as to be inclined along the end face 2A. In other words, when an inclination angle of the end face 2A (an inclination angle relative to the Y direction) is $\theta_0$, a straight line connecting the fusing positions 4F of the optical fibers with lenses 4 arranged in the Y direction is inclined by an angle of $\theta_0$ relative to the Y direction. Specifically, the angle $\theta_0$ may be 4 degrees or more, favorably 6 degrees or more, and more favorably 8 degrees or more.

The ferrules 2 holding the optical fiber with lens 4 as described above each have the inclined end face 2A, and in all of the held optical fibers with lenses 4, a lens length L0 of the GRIN lenses 4B is the same. Accordingly, all of the optical fibers with lenses 4 held by the ferrules 2 assume a same optically coupled state by vertically flipping and connecting a pair of the ferrules 2, and by setting an appropriate end face interval relative to the inclination angle $\theta_0$ of the end face 2A, all of the optical fibers with lenses 4 are able to realize low-loss optical coupling with coinciding beam waist positions.

Figure 4:
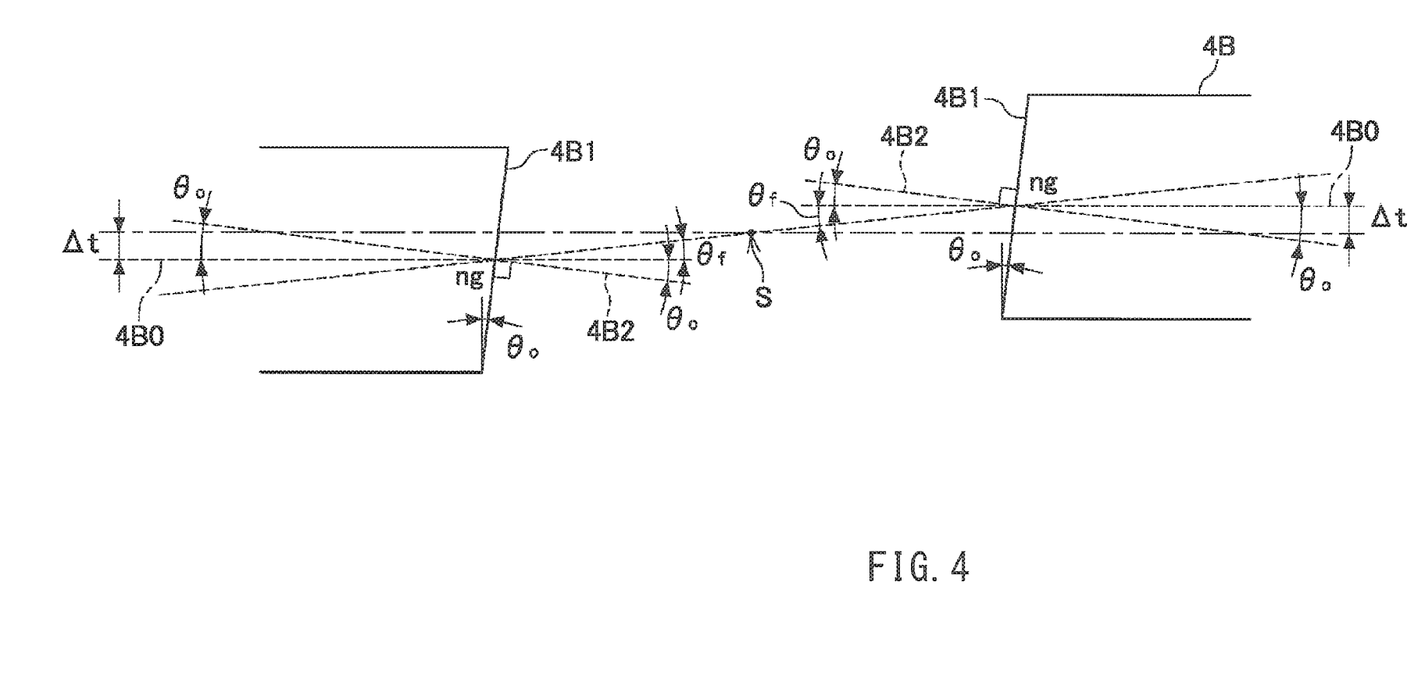
FIG. 4 is an explanatory diagram showing a coupled state of each optical fiber with lens.

FIG. 4 shows a coupled state of each optical fiber with lens 4. When the GRIN lens 4B having an inclined end face 4B1 ("4B2" in the diagram denotes a perpendicular to the inclined end face 4B1) is coupled by eccentrically moving the GRIN lens 4B in the inclination direction by Δt, light passing a central axis 4B0 of the GRIN lens 4B is emitted in a direction of an angle θf relative to the central axis 4B0. In order to set a center of optical coupling S of light emitted from one GRIN lens 4B and incident to another GRIN lens 4B at a beam waist position, when a beam waist distance is denoted by W, a central refractive index of the GRIN lens 4B is denoted by ng, and the inclination angle of the inclined end face 4B1 is denoted by $\theta_0$, a relationship expressed by (1) below is satisfied in accordance with Snell's law (given that a space between end faces has a refractive index of 1) and, at the same time, a relationship among an emission angle θf, an amount of eccentricity Δt, and the beam waist distance (a center distance of space) W is expressed by (2) below. The expressions (1) and (2) below enable an amount of eccentricity Δt and the inclination angle $\theta_0$ of the end face to be appropriately designed.

$$ng \cdot \sin \theta_0 = \sin(\theta f + \theta_0) \quad (1)$$

$$\sin \theta f = \Delta t / W \quad (2)$$

A method of manufacturing such a multicore optical connector will now be described. The ferrule 2 can be formed by insert molding using a mold in which a pin for forming the holes 2P and the guide hole 2Q is positioned. By appropriately eccentrically moving the position of the pin relative to a center of the mold, a ferrule 2 can be formed in which the center of arrangement Op of the large number of rows of the holes 2P is eccentric by Δt relative to the central axis Of.

Figure 5:
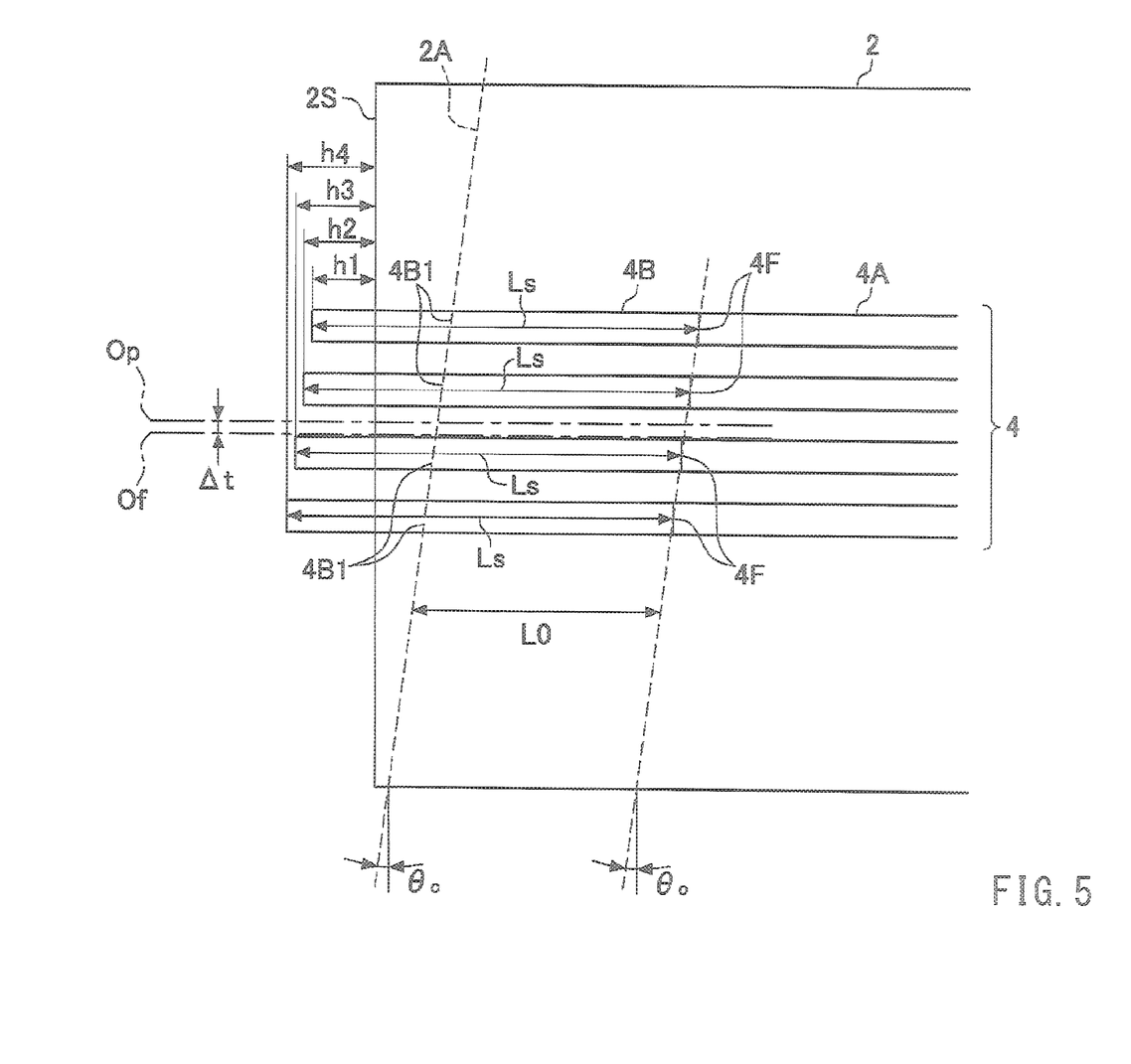
FIG. 5 is an explanatory diagram showing a method of manufacturing a multicore optical connector (first example) according to an embodiment of the present invention.

FIG. 5 shows all example of a step of fixing the optical fiber with lens 4 to the ferrule 2 and a step of polishing an end face of the ferrule 2 to form an inclined end face. In this example, in the optical fiber with lens 4 prior to fixing, the GRIN lenses 4B, all of which having a same length Ls, are fused to the optical fibers 4A. When fixing the optical fiber with lens 4 to the ferrule 2, fusing positions 4F are arranged so as to he inclined by providing differences in amounts of protrusion (h1, h2, h3, and h4) by which the GRIN lenses 4B protrude from end faces 2S of the ferrules 2 prior to polishing. In this case, an inclination angle of a straight line connecting the fusing positions 4F is set to $\theta_0$ by appropriately setting the amounts of protrusion (h1, h2, h3, and h4). In this state, the optical fiber wish lens 4 inserted into the hole 2P is fixed to the ferrule 2.

Next, the end face 2S and the GRIN lens 4B protruding from the end face 2S are polished. By this polishing, the inclined end face 2A is formed and, at the same time, the inclined end face 4B1 of the GRIN lens 4B is formed. An amount of polishing at this point is set so that a lens length of the GRIN lens 4B equals the set lens length L0.

Figure 6:
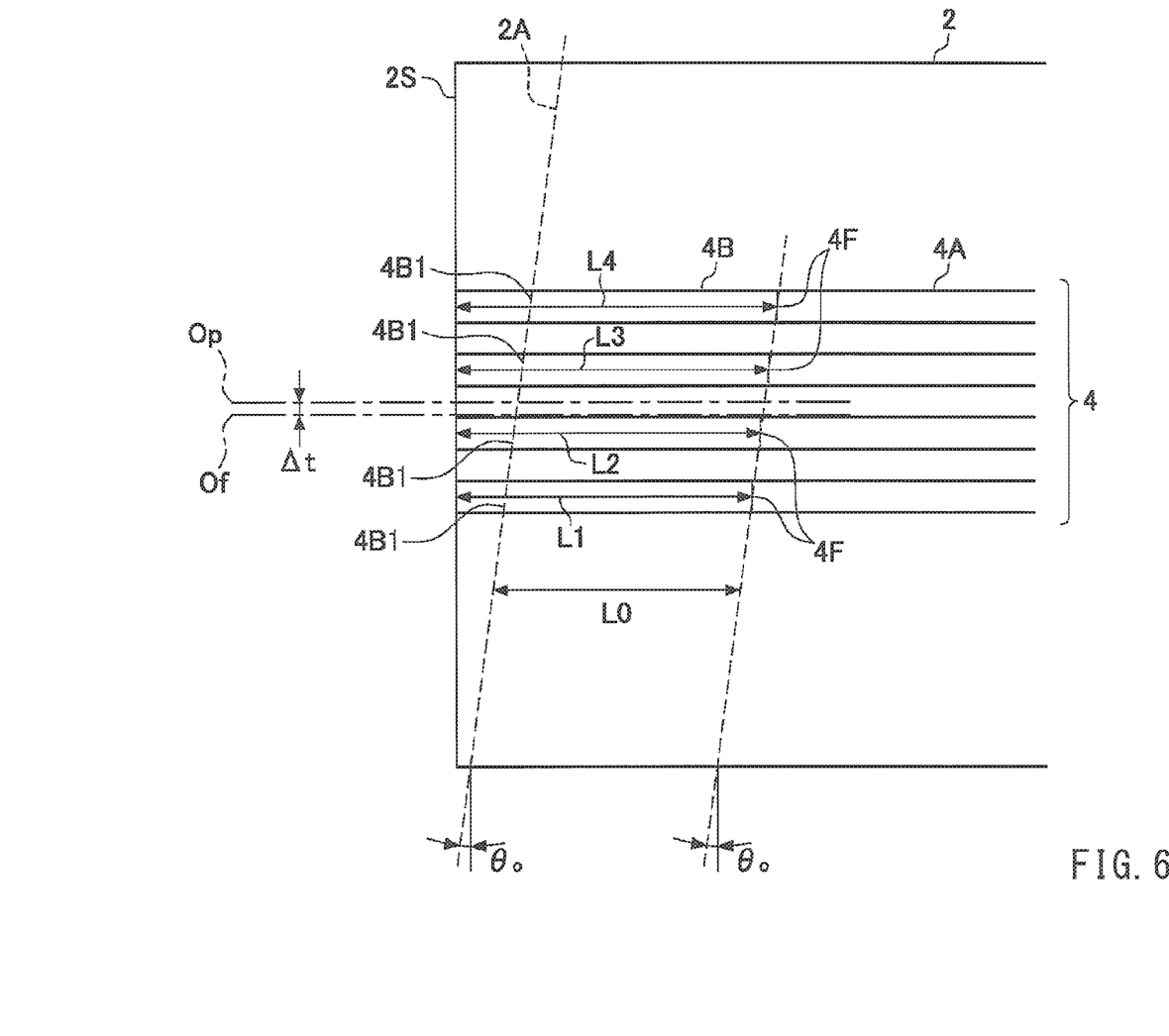
FIG. 6 is an explanatory diagram showing a method of manufacturing a multicore optical connector (second example) according to an embodiment of the present invention.

FIG. 6 shows another example of the step of fixing the optical fiber with lens 4 to the ferrule 2 and the step of polishing an end face of the ferrule 2 to form an inclined end face. In this example, in the optical fiber with lens 4 prior to fixing, the lengths of the GRIN lenses 4B are set to different lengths (L1, L2, L3, and L4). In addition, by arranging the end faces of the GRIN lenses 4B with the different lengths so as to be flush with the end face 2S of the ferrule 2 prior to polishing, the fusing positions 4F are arranged so as to be inclined. In this case, an inclination angle of a straight line connecting the fusing positions 4F is set to $\theta_0$ by appropriately setting the lengths (L1, L2, L3, and L4) of the GRIN lenses 4B. In this state, the optical fiber with Jens 4 inserted into the hole 2P is fixed to the ferrule 2.

Next, the end face 2S and the GRIN lens 4B are polished. By this polishing, the inclined end face 2A is formed and, at the same time, the inclined end face 4B1 of the GRIN lens 4B is formed. An amount of polishing at this point is set so that a lens length of the GRIN lens 4B equals the set lens length L0.

With the multicore optical connector 1 including the ferrule 2 which holds the optical fiber with lens 4 configured as described above, by inclining an end face of the GRIN lens 4B of the optical fiber with lens 4 relative to the central axis Of of the ferrule 2, reflection return light can be reduced and, at the same time, inverse incidence of reflection return light to the optical fiber 4A can be suppressed. In addition, by arranging fusing positions 4F between the GRIN lenses 4B and the optical fibers 4A so as to be inclined along an inclination of an end face of the ferrule 2, multicore connector connection of optical fibers with lenses 4 can be performed while keeping a lens length L0 of the GRIN lenses 4B constant. Accordingly, in the multicore optical connector 1 in which a plurality of optical fibers with lenses 4 are arranged and held in the ferrule 2, reflection return light can be suppressed and low-loss connection can be performed.

While embodiments of the present invention have been described in detail with reference to the drawings, it is to be understood that specific configurations of the present invention are not limited to the embodiments and that various design modifications and the like may be made without departing from the spirit and scope of the invention. In addition, the embodiments described above may be implemented so as to combine respective techniques as long as there are no contradictions, problems, and the like in an object, a configuration, and the like of such implementations.

REFERENCE SIGNS LIST

1 Multicore optical connector
2 Ferrule
2A End face
2P Hole
2Q Guide hole
3 Coupling member
3A Guide pin
3B Clamp spring
4 Optical fiber with lens
4A Optical fiber
4B GRIN lens

The invention claimed is:

1. A multicore optical connector, comprising: a ferrule in which a plurality of optical fibers with lenses are arranged and held, said optical fibers with lenses having GRIN lenses fused to tips of optical fibers; and a coupling member which couples a pair of said ferrules so that said ferrules oppose each other in a non-contact state and end faces of said ferrules are parallel to each other, wherein said ferrules each have said end face inclined by a set angle relative to a central axis, and said GRIN lenses are arranged and held parallel to said central axis so that a center of arrangement is at a position eccentric relative to said central axis, and said optical fibers with lenses held by the pair of said ferrules have end faces of said GRIN lenses inclined along said end faces of said ferrules so that said optical fibers with lenses are optically coupled to each other, and in said optical fibers with lenses arranged in an inclination direction of said end faces of said ferrules, fusing positions between said GRIN lenses and said optical fibers are arranged so as to be inclined along said end faces by a set non-zero angle.

2. The multicore optical connector according to claim 1, wherein said end faces of a respective ferrule and said end faces of respective GRIN lenses in said respective ferrule are surfaces polished at a same time.

3. A method of manufacturing a multicore optical connector including a ferrule in which a plurality of optical fibers with lenses are arranged and held, said optical fibers with lenses having GRIN lenses fused to tips of optical fibers, and a coupling member which couples a pair of said ferrules so that said ferrules oppose each other in a non-contact state and end faces of said ferrules are parallel to each other, the method comprising:
  molding each of said ferrules in which a plurality of holes along a central axis of said ferrule are arranged so that a center of arrangement is eccentric relative to said central axis;
  inserting said optical fibers with lenses into said holes, arranging fusing positions between said GRIN lenses and said optical fibers so as to be inclined by a set non-zero angle relative to said central axis, and fixing said optical fibers with lenses to said ferrules; and
  polishing said end faces of said ferrules so that a direction of inclined arrangement of said fusing positions is parallel to said end faces.

4. The method of manufacturing a multicore optical connector according to claim 3, wherein said fusing positions are arranged so as to be inclined by providing differences in amounts of protrusion by which said GRIN lenses protrude from said end faces of said ferrules prior to polishing.

5. The method of manufacturing a multicore optical connector according to claim 3, wherein said fusing positions are arranged so as to be inclined by arranging end faces of said GRIN lenses with different lengths so as to be flush with said end faces of said ferrules prior to polishing.

6. The method of manufacturing a multicore optical connector according to claim 3, wherein after the polishing, said GRIN lenses have lengths which are the same.

7. The method of manufacturing a multicore optical connector according to claim 3, wherein before the polishing, said fusing positions are arranged at different spacings from an end face of each respective ferrule.

8. A method of manufacturing a multicore optical connector including a ferrule in which a plurality of optical fibers with lenses are arranged and held, said optical fibers with lenses having GRIN lenses fused to tips of optical fibers, and a coupling member which couples a pair of said ferrules so that said ferrules oppose each other in a non-contact state and end faces of said ferrules are parallel to each other, the method comprising:
  molding each of said ferrules in which a plurality of holes along a central axis of said ferrule are arranged so that a center of arrangement is eccentric relative to said central axis;
  inserting said optical fibers with lenses into said holes, arranging fusing positions between said GRIN lenses and said optical fibers so that locations of the fusing positions are inclined by a set non-zero angle relative to said central axis, and fixing said optical fibers with lenses to said ferrules; and
  after the inserting, polishing said end faces of said ferrules and of said GRIN lenses so that a direction of inclined arrangement of said fusing positions is parallel to said end faces.

9. The method of manufacturing a multicore optical connector according to claim 8, wherein after the polishing, said GRIN lenses have lengths which are the same.

10. The method of manufacturing a multicore optical connector according to claim 8, wherein before the polishing, said fusing positions are arranged at different spacings from an end face of each respective ferrule.

* * * * *